(12) United States Patent
Townes et al.

(10) Patent No.: US 11,015,458 B2
(45) Date of Patent: May 25, 2021

(54) TURBOMACHINE FOR A GAS TURBINE ENGINE

(71) Applicant: ROLLS-ROYCE plc, London (GB)

(72) Inventors: Roderick M Townes, Derby (GB); Neal Carter, Derby (GB); Thomas W Martin, Derby (GB)

(73) Assignee: ROLLS-ROYCE PLC, London (GB)

( * ) Notice: Subject to any disclaimer, the term of this patent is extended or adjusted under 35 U.S.C. 154(b) by 0 days.

(21) Appl. No.: 16/797,414

(22) Filed: Feb. 21, 2020

(65) Prior Publication Data

US 2020/0284154 A1   Sep. 10, 2020

(30) Foreign Application Priority Data

Mar. 4, 2019 (GB) ...................................... 1902879

(51) Int. Cl.
*F01D 11/08* (2006.01)
*F01D 5/22* (2006.01)

(52) U.S. Cl.
CPC .............. *F01D 5/225* (2013.01); *F01D 11/08* (2013.01); *F05D 2240/24* (2013.01)

(58) Field of Classification Search
None
See application file for complete search history.

(56) References Cited

U.S. PATENT DOCUMENTS

| 8,864,453 | B2 | 10/2014 | Spracher et al. | |
| 10,738,693 | B2 * | 8/2020 | Whittle | F02K 3/06 |
| 10,844,721 | B2 * | 11/2020 | Townes | F01D 5/043 |
| 2002/0067987 | A1 | 6/2002 | Toborg et al. | |
| 2009/0297350 | A1 * | 12/2009 | Augustine | F01D 11/006 416/192 |
| 2010/0178160 | A1 * | 7/2010 | Liotta | F01D 11/006 415/173.7 |
| 2011/0052376 | A1 | 3/2011 | Sreeram | |
| 2012/0308364 | A1 * | 12/2012 | Hofmann | F04D 29/563 415/148 |
| 2015/0071771 | A1 | 3/2015 | Zheng et al. | |
| 2015/0240644 | A1 | 8/2015 | Ross et al. | |
| 2016/0186592 | A1 | 6/2016 | Healy et al. | |
| 2019/0301303 | A1 * | 10/2019 | Clowes | F01D 25/28 |
| 2020/0049024 | A1 * | 2/2020 | Szarvasy | F02C 7/28 |
| 2020/0049072 | A1 * | 2/2020 | Whittle | F02C 7/18 |

(Continued)

FOREIGN PATENT DOCUMENTS

EP   2586968 A2   5/2013

OTHER PUBLICATIONS

Search Report of the Intellectual Property Office of the United Kingdom for GB1902879.4 with search date of Aug. 15, 2019.

*Primary Examiner* — Michael Lebentritt
(74) *Attorney, Agent, or Firm* — Oliff PLC

(57) ABSTRACT

A turbomachine for a gas turbine engine, comprising: a rotor disc arranged to rotate about a fixed central axis. A plurality of rotor blades connected to the rotor disc, wherein the rotor blades extend within a gas flow path. A rotating annulus is arranged to rotate in a fixed rotational alignment relative to the rotor disc. An outer surface of the rotating annulus is arranged to define part of the boundary of the gas flow path. A gas turbine engine for an aircraft and a method of defining the boundary of a gas flow path within a turbomachine is also disclosed.

19 Claims, 8 Drawing Sheets

(56) References Cited

U.S. PATENT DOCUMENTS

| | | | |
|---|---|---|---|
| 2020/0049104 A1* | 2/2020 | Townes | F01D 5/284 |
| 2020/0088104 A1* | 3/2020 | Kallianteris | F16H 57/082 |
| 2020/0088332 A1* | 3/2020 | Innis | F16L 27/11 |
| 2020/0124002 A1* | 4/2020 | Uhkoetter | F02K 3/06 |
| 2020/0171577 A1* | 6/2020 | Clark | F02C 7/36 |
| 2020/0191005 A1* | 6/2020 | Hillier | F01D 11/005 |
| 2020/0308968 A1* | 10/2020 | Eryilki | F04D 29/324 |

* cited by examiner

TURBOMACHINE FOR A GAS TURBINE ENGINE

CROSS-REFERENCE TO RELATED APPLICATIONS

This specification is based upon and claims the benefit of priority from United Kingdom patent application number GB 1902879.4 filed on Mar. 4, 2019, the entire contents of which are incorporated herein by reference.

BACKGROUND

Field of the Disclosure

The present disclosure relates to turbomachine, such as a compressor or a turbine, for a gas turbine engine. The gas turbine engine may be for an aircraft. The disclosure also relates to a method of defining the boundary of a gas flow path within a turbomachine.

Background of the Disclosure

A gas turbine engine comprises one or more compressors or turbines (i.e. one or more turbomachines), each having one or more rotor discs carrying a plurality of rotor blades. The rotor blades are disposed within a main annulus gas flow path in which a flow of gas either drives rotation of the rotor discs in the case of a turbine or is compressed by rotation of the rotor discs in the case of a compressor.

Each rotor disc forms a different stage of the compressor or turbine. Between the rotor discs an inter-stage disc cavity is formed. This cavity must be sealed to reduce leakage of gas flow within the surrounding main annulus gas flow path into the inter-stage disc cavity.

In order to provide a boundary between the inter-stage disc cavity and the gas flow path an inter-stage seal may be provided. Existing inter-stage seals may be formed by a static structure (relative to the rotor discs) that is coupled to a stationary guide vane arranged to guide airflow between the stages of the compressor or turbine. This may result in the stationary guide vane being subjected to additional load in order to support the inter-stage seal. The additional load placed on the stationary guide vane may place restrictions on the materials from which it can be made, or require additional structural supporting components adding weight and complexity.

Furthermore, additional sealing is required at the first stage rotor blades and stationary guide vane interface and between the stationary guide vane interface and second stage rotor blades. This may require significant use of secondary airflow systems in order to reduce leakage from the main gas flow path. The additional burden on the secondary air flow systems may result in a reduction in overall engine performance.

SUMMARY OF THE DISCLOSURE

According to a first aspect, there is provided a turbomachine for a gas turbine engine, comprising: a rotor disc arranged to rotate about a fixed central axis; a plurality of rotor blades connected to the rotor disc, the rotor blades extending within a gas flow path; and a rotating annulus arranged to rotate in a fixed rotational alignment relative to the rotor disc; wherein an outer surface of the rotating annulus is arranged to define part of the boundary of the gas flow path, and wherein the rotating annulus is mounted directly to the rotor disc to provide the rotational alignment between them.

The rotating annulus may allow improved sealing for the gas flow path. The need for a boundary structure coupled to a static guide vane disposed within the gas flow path may be avoided. This may remove or reduce the load applied to the static guide vane, and provide a less complex geometry. The need for rim seals between the rotor blades or rotor disc and a relatively stationary boundary structure may also be avoided. This may improve sealing and reduce the secondary airflow system consumption required to contain the gas flow, thus improving the efficiency of the gas turbine engine.

Each of the rotor blades may be connected to the rotor disc by a respective interlocking connection, each interlocking connection comprising an interlocking profile on the rotor disc and a corresponding interlocking profile on the respective rotor blade. The rotating annulus may comprise one or more interlocking profiles each adapted to form an interlocking connection with one or more of the interlocking profiles provided on the rotor disc.

The one or more interlocking profiles provided on the rotating annulus may have a different size and/or shape compared to the interlocking profile provided on each of the rotor blades.

One or more of the interlocking connections may further comprise an adapter member. The adapter member may have a first interlocking profile shaped to interlock with the interlocking profile on the respective rotor disc and a different second interlocking profile shaped to interlock with the interlocking profile on the rotating annulus.

The interlocking profile provided on each rotor blade may comprise at least three lobes or recesses (e.g. a fir tree connection) and the, or each, interlocking profile formed on the rotating annulus may comprise two lobes or recesses (e.g. a dovetail connection).

The rotor disc may comprise a peripheral cantilevered portion extending axially from the body of the rotor disc. Each of the interlocking profiles adapted to form an interlocking connection with the rotating annulus may be formed in the cantilevered portion.

The rotor disc may comprise a protrusion extending axially from a face of the rotor disc. The rotating annulus may be mounted to the rotor disc via the protrusion. A fastening mechanism may be provided to axially retain the rotating annulus to the rotor disc. The fastening mechanism may comprise a locking bayonet or a retaining ring/circlip.

The rotating annulus may be mounted to an intermediate rotor disc. The intermediate rotor disc may be arranged to rotate around the central axis in a stationary rotational alignment with the rotor disc.

The rotating annulus may be mounted to the intermediate rotor disc by an interlocking connection. The interlocking connection may be a dovetail connection.

The rotating annulus may be mounted to one or more of the plurality of rotor blades to provide rotational alignment between the rotor disc and the rotating annulus.

The rotating annulus may be mounted to a blade platform of one or more of the plurality of rotor blades.

The blade platform may further comprise an axially extending hook member, wherein the rotating annulus is mounted to the hook member.

An outer surface of each blade platform may form part of the boundary of the gas flow path. The hook member may extend from a point at or near the outer surface of the blade platform.

The rotating annulus may comprise a plurality of blade apertures. The rotating annulus may be mounted to the rotor disc such that one or more of the plurality of rotor blades is received in a respective one of the plurality of blade apertures and such that each rotor blade extends through the body of the rotating annulus.

The rotating annulus may be formed from a high temperature capable material. The high temperature capable material may be a ceramic matrix composite (CMC) material.

The rotating annulus may comprise a sealing feature adapted to seal to a static guide vane disposed within the gas flow path.

The sealing feature may comprise a trench region formed in the outer surface of the rotating annulus. The trench region may be arranged to receive a platform of the static guide vane.

The sealing feature may comprise one or more seal fins disposed on a surface of the trench region. The one or more seal fins may be adapted to form a seal between the rotating annulus and the static guide vane.

The rotating annulus may be formed from a plurality of segments. Each segment may be individually mounted in a fixed rotational alignment with the rotor disc.

The rotor disc may be a first rotor disc and the turbomachine may further comprise a second rotor disc. The first and second rotor discs may define an interdisc cavity between them. The rotating annulus may be arranged to define the boundary between the gas flow path and the interdisc cavity.

According to a second aspect, there is provided a gas turbine engine for an aircraft, the gas turbine engine comprising the turbomachine according to the first aspect and including any of the features of the statements above.

According to a third aspect, there is provided a method of defining the boundary of a gas flow path within a turbomachine, the method comprising: mounting the rotating annulus according to the first aspect, including any of the features of the statements above, such that the rotating annulus is arranged to rotate in a fixed alignment relative to a rotor disc of the turbomachine.

As noted elsewhere herein, the present disclosure may relate to a gas turbine engine. Such a gas turbine engine may comprise an engine core comprising a turbine, a combustor, a compressor, and a core shaft connecting the turbine to the compressor. Such a gas turbine engine may comprise a fan (having fan blades) located upstream of the engine core.

Arrangements of the present disclosure may be particularly, although not exclusively, beneficial for fans that are driven via a gearbox. Accordingly, the gas turbine engine may comprise a gearbox that receives an input from the core shaft and outputs drive to the fan so as to drive the fan at a lower rotational speed than the core shaft. The input to the gearbox may be directly from the core shaft, or indirectly from the core shaft, for example via a spur shaft and/or gear. The core shaft may rigidly connect the turbine and the compressor, such that the turbine and compressor rotate at the same speed (with the fan rotating at a lower speed).

The gas turbine engine as described and/or claimed herein may have any suitable general architecture. For example, the gas turbine engine may have any desired number of shafts that connect turbines and compressors, for example one, two or three shafts. Purely by way of example, the turbine connected to the core shaft may be a first turbine, the compressor connected to the core shaft may be a first compressor, and the core shaft may be a first core shaft. The engine core may further comprise a second turbine, a second compressor, and a second core shaft connecting the second turbine to the second compressor. The second turbine, second compressor, and second core shaft may be arranged to rotate at a higher rotational speed than the first core shaft.

In such an arrangement, the second compressor may be positioned axially downstream of the first compressor. The second compressor may be arranged to receive (for example directly receive, for example via a generally annular duct) flow from the first compressor.

The gearbox may be arranged to be driven by the core shaft that is configured to rotate (for example in use) at the lowest rotational speed (for example the first core shaft in the example above). For example, the gearbox may be arranged to be driven only by the core shaft that is configured to rotate (for example in use) at the lowest rotational speed (for example only be the first core shaft, and not the second core shaft, in the example above). Alternatively, the gearbox may be arranged to be driven by any one or more shafts, for example the first and/or second shafts in the example above.

The gearbox may be a reduction gearbox (in that the output to the fan is a lower rotational rate than the input from the core shaft). Any type of gearbox may be used. For example, the gearbox may be a "planetary" or "star" gearbox, as described in more detail elsewhere herein. The gearbox may have any desired reduction ratio (defined as the rotational speed of the input shaft divided by the rotational speed of the output shaft), for example greater than 2.5, for example in the range of from 3 to 4.2, or 3.2 to 3.8, for example on the order of or at least 3, 3.1, 3.2, 3.3, 3.4, 3.5, 3.6, 3.7, 3.8, 3.9, 4, 4.1 or 4.2. The gear ratio may be, for example, between any two of the values in the previous sentence. Purely by way of example, the gearbox may be a "star" gearbox having a ratio in the range of from 3.1 or 3.2 to 3.8. In some arrangements, the gear ratio may be outside these ranges.

In any gas turbine engine as described and/or claimed herein, a combustor may be provided axially downstream of the fan and compressor(s). For example, the combustor may be directly downstream of (for example at the exit of) the second compressor, where a second compressor is provided. By way of further example, the flow at the exit to the combustor may be provided to the inlet of the second turbine, where a second turbine is provided. The combustor may be provided upstream of the turbine(s).

The or each compressor (for example the first compressor and second compressor as described above) may comprise any number of stages, for example multiple stages. Each stage may comprise a row of rotor blades and a row of stator vanes, which may be variable stator vanes (in that their angle of incidence may be variable). The row of rotor blades and the row of stator vanes may be axially offset from each other.

The or each turbine (for example the first turbine and second turbine as described above) may comprise any number of stages, for example multiple stages. Each stage may comprise a row of rotor blades and a row of stator vanes. The row of rotor blades and the row of stator vanes may be axially offset from each other.

Each fan blade may be defined as having a radial span extending from a root (or hub) at a radially inner gas-washed location, or 0% span position, to a tip at a 100% span position. The ratio of the radius of the fan blade at the hub to the radius of the fan blade at the tip may be less than (or on the order of) any of: 0.4, 0.39, 0.38 0.37, 0.36, 0.35, 0.34, 0.33, 0.32, 0.31, 0.3, 0.29, 0.28, 0.27, 0.26, or 0.25. The ratio of the radius of the fan blade at the hub to the radius of the fan blade at the tip may be in an inclusive range bounded by any two of the values in the previous sentence (i.e. the values may form upper or lower bounds), for example in the range of from 0.28 to 0.32. These ratios may commonly be referred to as the hub-to-tip ratio. The radius at the hub and the radius at the tip may both be measured at the leading edge (or axially forwardmost) part of the blade. The hub-to-tip ratio refers, of course, to the gas-washed portion of the fan blade, i.e. the portion radially outside any platform.

The radius of the fan may be measured between the engine centreline and the tip of a fan blade at its leading edge. The fan diameter (which may simply be twice the radius of the fan) may be greater than (or on the order of) any of: 220 cm, 230 cm, 240 cm, 250 cm (around 100 inches), 260 cm, 270 cm (around 105 inches), 280 cm (around 110 inches), 290 cm (around 115 inches), 300 cm (around 120 inches), 310 cm, 320 cm (around 125 inches), 330 cm (around 130 inches), 340 cm (around 135 inches), 350 cm, 360 cm (around 140 inches), 370 cm (around 145 inches), 380 (around 150 inches) cm, 390 cm (around 155 inches), 400 cm, 410 cm (around 160 inches) or 420 cm (around 165 inches). The fan diameter may be in an inclusive range bounded by any two of the values in the previous sentence (i.e. the values may form upper or lower bounds), for example in the range of from 20 cm to 280 cm or 330 cm to 380 cm.

The rotational speed of the fan may vary in use. Generally, the rotational speed is lower for fans with a higher diameter. Purely by way of non-limitative example, the rotational speed of the fan at cruise conditions may be less than 2500 rpm, for example less than 2300 rpm. Purely by way of further non-limitative example, the rotational speed of the fan at cruise conditions for an engine having a fan diameter in the range of from 220 cm to 300 cm (for example 240 cm to 280 cm or 250 cm to 270 cm) may be in the range of from 1700 rpm to 2500 rpm, for example in the range of from 1800 rpm to 2300 rpm, for example in the range of from 1900 rpm to 2100 rpm. Purely by way of further non-limitative example, the rotational speed of the fan at cruise conditions for an engine having a fan diameter in the range of from 330 cm to 380 cm may be in the range of from 1200 rpm to 2000 rpm, for example in the range of from 1300 rpm to 1800 rpm, for example in the range of from 1400 rpm to 1800 rpm.

In use of the gas turbine engine, the fan (with associated fan blades) rotates about a rotational axis. This rotation results in the tip of the fan blade moving with a velocity $U_{tip}$. The work done by the fan blades 13 on the flow results in an enthalpy rise dH of the flow. A fan tip loading may be defined as $dH/U_{tip}^2$, where dH is the enthalpy rise (for example the 1-D average enthalpy rise) across the fan and $U_{tip}$ is the (translational) velocity of the fan tip, for example at the leading edge of the tip (which may be defined as fan tip radius at leading edge multiplied by angular speed). The fan tip loading at cruise conditions may be greater than (or on the order of) any of: 0.28, 0.29 0.3, 0.31, 0.32, 0.33, 0.34, 0.35, 0.36, 0.37, 0.38, 0.39 or 0.4 (all units in this paragraph being $Jkg^{-1}K^{-1}/(ms^{-1})^2$). The fan tip loading may be in an inclusive range bounded by any two of the values in the previous sentence (i.e. the values may form upper or lower bounds), for example in the range of from 0.28 to 0.31 or 0.29 to 0.3.

Gas turbine engines in accordance with the present disclosure may have any desired bypass ratio, where the bypass ratio is defined as the ratio of the mass flow rate of the flow through the bypass duct to the mass flow rate of the flow through the core at cruise conditions. In some arrangements the bypass ratio may be greater than (or on the order of) any of the following: 10, 10.5, 11, 11.5, 12, 12.5, 13, 13.5, 14, 14.5, 15, 15.5, 16, 16.5, 17, 17.5, 18, 18.5, 19, 19.5 or 20. The bypass ratio may be in an inclusive range bounded by any two of the values in the previous sentence (i.e. the values may form upper or lower bounds), for example in the range of from 13 to 16, or 13 to 15, or 13 to 14. The bypass duct may be substantially annular. The bypass duct may be radially outside the engine core. The radially outer surface of the bypass duct may be defined by a nacelle and/or a fan case.

The overall pressure ratio of a gas turbine engine as described and/or claimed herein may be defined as the ratio of the stagnation pressure upstream of the fan to the stagnation pressure at the exit of the highest pressure compressor (before entry into the combustor). By way of non-limitative example, the overall pressure ratio of a gas turbine engine as described and/or claimed herein at cruise may be greater than (or on the order of) any of the following: 35, 40, 45, 50, 55, 60, 65, 70, 75. The overall pressure ratio may be in an inclusive range bounded by any two of the values in the previous sentence (i.e. the values may form upper or lower bounds), for example in the range of from 50 to 70.

Specific thrust of an engine may be defined as the net thrust of the engine divided by the total mass flow through the engine. At cruise conditions, the specific thrust of an engine described and/or claimed herein may be less than (or on the order of) any of the following: 110 $Nkg^{-1}s$, 105 $Nkg^{-1}s$, 100 $Nkg^{-1}s$, 95 $Nkg^{-1}s$, 90 $Nkg^{-1}s$, 85 $Nkg^{-1}s$ or 80 $Nkg^{-1}s$. The specific thrust may be in an inclusive range bounded by any two of the values in the previous sentence (i.e. the values may form upper or lower bounds), for example in the range of from 80 $Nkg^{-1}$'s to 100 $Nkg^{-1}s$, or 85 $Nkg^{-1}s$ to 95 $Nkg^-s$. Such engines may be particularly efficient in comparison with conventional gas turbine engines.

A gas turbine engine as described and/or claimed herein may have any desired maximum thrust. Purely by way of non-limitative example, a gas turbine as described and/or claimed herein may be capable of producing a maximum thrust of at least (or on the order of) any of the following: 160 kN, 170 kN, 180 kN, 190 kN, 200 kN, 250 kN, 300 kN, 350 kN, 400 kN, 450 kN, 500 kN, or 550 kN. The maximum thrust may be in an inclusive range bounded by any two of the values in the previous sentence (i.e. the values may form upper or lower bounds). Purely by way of example, a gas turbine as described and/or claimed herein may be capable of producing a maximum thrust in the range of from 330 kN to 420 kN, for example 350 kN to 400 kN The thrust referred to above may be the maximum net thrust at standard atmospheric conditions at sea level plus 15 degrees C. (ambient pressure 101.3 kPa, temperature 30 degrees C.), with the engine static.

In use, the temperature of the flow at the entry to the high pressure turbine may be particularly high. This temperature, which may be referred to as TET, may be measured at the exit to the combustor, for example immediately upstream of the first turbine vane, which itself may be referred to as a nozzle guide vane. At cruise, the TET may be at least (or on the order of) any of the following: 1400K, 1450K, 1500K, 1550K, 1600K or 1650K. The TET at cruise may be in an inclusive range bounded by any two of the values in the previous sentence (i.e. the values may form upper or lower bounds), for example in the range of from 1800K to 1950K. The maximum TET in use of the engine may be, for example, at least (or on the order of) any of the following: 1700K, 1750K, 1800K, 1850K, 1900K, 1950K or 2000K. The maximum TET may be in an inclusive range bounded by any two of the values in the previous sentence (i.e. the values may form upper or lower bounds). The maximum TET may occur, for example, at a high thrust condition, for example at a maximum take-off (MTO) condition.

A fan blade and/or aerofoil portion of a fan blade described and/or claimed herein may be manufactured from any suitable material or combination of materials. For example at least a part of the fan blade and/or aerofoil may be manufactured at least in part from a composite, for example a metal matrix composite and/or an organic matrix composite, such as carbon fibre. By way of further example at least a part of the fan blade and/or aerofoil may be manufactured at least in part from a metal, such as a titanium based metal or an aluminium based material (such as an aluminium-lithium alloy) or a steel based material. The fan blade may comprise at least two regions manufactured using different materials. For example, the fan blade may have a protective leading edge, which may be manufactured using a material that is better able to resist impact (for example from birds, ice or other material) than the rest of the blade. Such a leading edge may, for example, be manufactured using titanium or a titanium-based alloy. Thus, purely by way of example, the fan blade may have a carbon-fibre or aluminium based body (such as an aluminium lithium alloy) with a titanium leading edge.

A fan as described and/or claimed herein may comprise a central portion, from which the fan blades may extend, for example in a radial direction. The fan blades may be attached to the central portion in any desired manner. For example, each fan blade may comprise a fixture which may engage a corresponding slot in the hub (or disc). Purely by way of example, such a fixture may be in the form of a dovetail that may slot into and/or engage a corresponding slot in the hub/disc in order to fix the fan blade to the hub/disc. By way of further example, the fan blades maybe formed integrally with a central portion. Such an arrangement may be referred to as a blisk or a bling. Any suitable method may be used to manufacture such a blisk or bling. For example, at least a part of the fan blades may be machined from a block and/or at least part of the fan blades may be attached to the hub/disc by welding, such as linear friction welding.

The gas turbine engines described and/or claimed herein may or may not be provided with a variable area nozzle (VAN). Such a variable area nozzle may allow the exit area of the bypass duct to be varied in use. The general principles of the present disclosure may apply to engines with or without a VAN.

The fan of a gas turbine as described and/or claimed herein may have any desired number of fan blades, for example 14, 16, 18, 20, 22, 24 or 26 fan blades.

As used herein, cruise conditions may mean cruise conditions of an aircraft to which the gas turbine engine is attached. Such cruise conditions may be conventionally defined as the conditions at mid-cruise, for example the conditions experienced by the aircraft and/or engine at the midpoint (in terms of time and/or distance) between top of climb and start of decent.

Purely by way of example, the forward speed at the cruise condition may be any point in the range of from Mach 0.7 to 0.9, for example 0.75 to 0.85, for example 0.76 to 0.84, for example 0.77 to 0.83, for example 0.78 to 0.82, for example 0.79 to 0.81, for example on the order of Mach 0.8, on the order of Mach 0.85 or in the range of from 0.8 to 0.85. Any single speed within these ranges may be the cruise condition. For some aircraft, the cruise conditions may be outside these ranges, for example below Mach 0.7 or above Mach 0.9.

Purely by way of example, the cruise conditions may correspond to standard atmospheric conditions at an altitude that is in the range of from 10000 m to 15000 m, for example in the range of from 10000 m to 12000 m, for example in the range of from 10400 m to 11600 m (around 38000 ft), for example in the range of from 10500 m to 11500 m, for example in the range of from 10600 m to 11400 m, for example in the range of from 10700 m (around 35000 ft) to 11300 m, for example in the range of from 10800 m to 11200 m, for example in the range of from 10900 m to 11100 m, for example on the order of 11000 m. The cruise conditions may correspond to standard atmospheric conditions at any given altitude in these ranges.

Purely by way of example, the cruise conditions may correspond to: a forward Mach number of 0.8; a pressure of 23000 Pa; and a temperature of −55 degrees C. Purely by way of further example, the cruise conditions may correspond to: a forward Mach number of 0.85; a pressure of 24000 Pa; and a temperature of −54 degrees C. (which may be standard atmospheric conditions at 35000 ft).

As used anywhere herein, "cruise" or "cruise conditions" may mean the aerodynamic design point. Such an aerodynamic design point (or ADP) may correspond to the conditions (comprising, for example, one or more of the Mach Number, environmental conditions and thrust requirement) for which the fan is designed to operate. This may mean, for example, the conditions at which the fan (or gas turbine engine) is designed to have optimum efficiency.

In use, a gas turbine engine described and/or claimed herein may operate at the cruise conditions defined elsewhere herein. Such cruise conditions may be determined by the cruise conditions (for example the mid-cruise conditions) of an aircraft to which at least one (for example 2 or 4) gas turbine engine may be mounted in order to provide propulsive thrust.

The skilled person will appreciate that except where mutually exclusive, a feature or parameter described in relation to any one of the above aspects may be applied to any other aspect. Furthermore, except where mutually exclusive, any feature or parameter described herein may be applied to any aspect and/or combined with any other feature or parameter described herein.

BRIEF DESCRIPTION OF THE DRAWINGS

Embodiments will now be described by way of example only, with reference to the Figures, in which.

DETAILED DESCRIPTION OF THE DISCLOSURE

Figure 1:
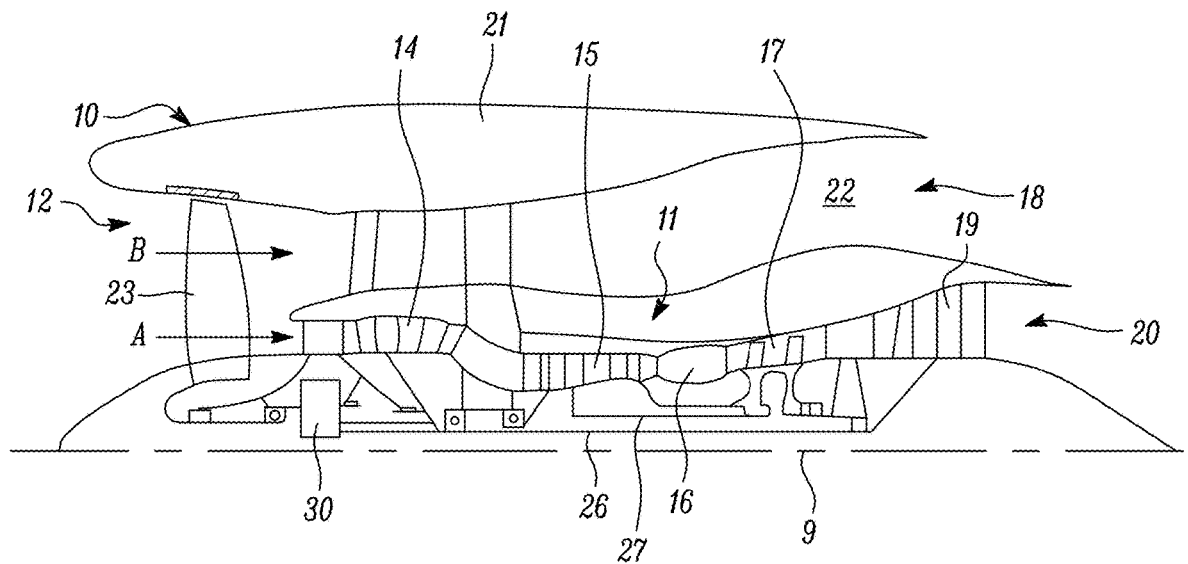
FIG. 1 is a sectional side view of a gas turbine engine.

FIG. 1 illustrates a gas turbine engine 10 having a principal rotational axis 9. The engine 10 comprises an air intake 12 and a propulsive fan 23 that generates two airflows: a core airflow A and a bypass airflow B. The gas turbine engine 10 comprises a core 11 that receives the core airflow A. The engine core 11 comprises, in axial flow series, a low pressure compressor 14, a high-pressure compressor 15, combustion equipment 16, a high-pressure turbine 17, a low pressure turbine 19 and a core exhaust nozzle 20. A nacelle 21 surrounds the gas turbine engine 10 and defines a bypass duct 22 and a bypass exhaust nozzle 18. The bypass airflow B flows through the bypass duct 22. The fan 23 is attached to and driven by the low pressure turbine 19 via a shaft 26 and an epicyclic gearbox 30.

In use, the core airflow A is accelerated and compressed by the low pressure compressor 14 and directed into the high pressure compressor 15 where further compression takes place. The compressed air exhausted from the high pressure compressor 15 is directed into the combustion equipment 16 where it is mixed with fuel and the mixture is combusted. The resultant hot combustion products then expand through, and thereby drive, the high pressure and low pressure turbines 17, 19 before being exhausted through the nozzle 20 to provide some propulsive thrust. The high pressure turbine 17 drives the high pressure compressor 15 by a suitable interconnecting shaft 27. The fan 23 generally provides the majority of the propulsive thrust. The epicyclic gearbox 30 is a reduction gearbox.

Figure 2:
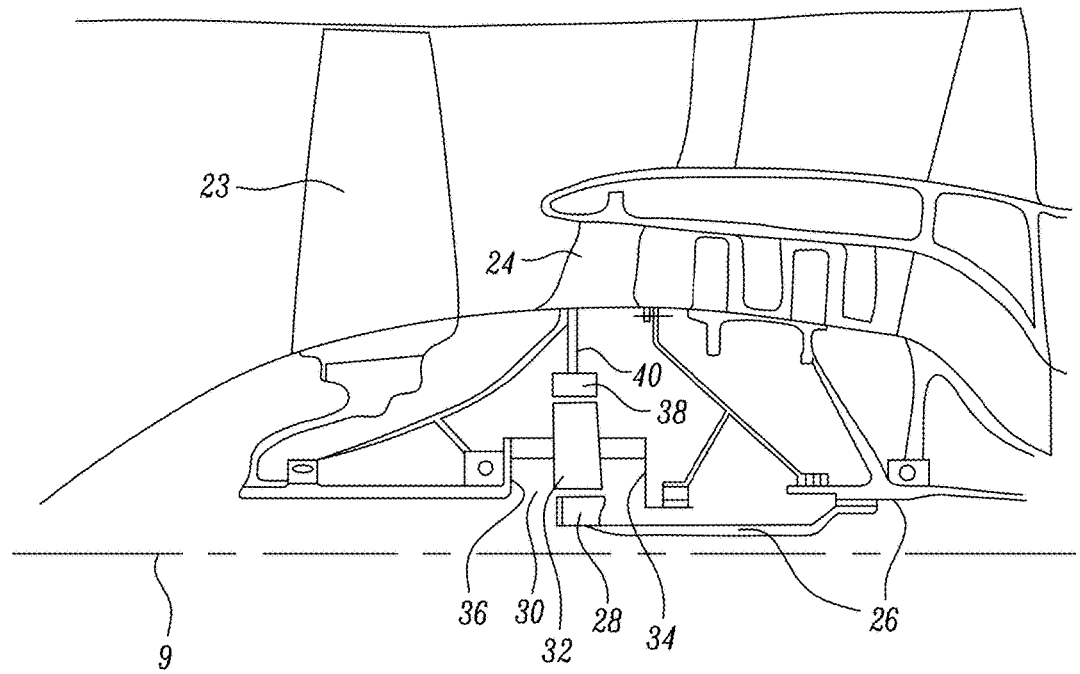
FIG. 2 is a close up sectional side view of an upstream portion of a gas turbine engine.

An exemplary arrangement for a geared fan gas turbine engine 10 is shown in FIG. 2. The low pressure turbine 19 (see FIG. 1) drives the shaft 26, which is coupled to a sun wheel, or sun gear, 28 of the epicyclic gear arrangement 30. Radially outwardly of the sun gear 28 and intermeshing therewith is a plurality of planet gears 32 that are coupled together by a planet carrier 34. The planet carrier 34 constrains the planet gears 32 to precess around the sun gear 28 in synchronicity whilst enabling each planet gear 32 to rotate about its own axis. The planet carrier 34 is coupled via linkages 36 to the fan 23 in order to drive its rotation about the engine axis 9. Radially outwardly of the planet gears 32 and intermeshing therewith is an annulus or ring gear 38 that is coupled, via linkages 40, to a stationary supporting structure 24.

Note that the terms "low pressure turbine" and "low pressure compressor" as used herein may be taken to mean the lowest pressure turbine stages and lowest pressure compressor stages (i.e. not including the fan 23) respectively and/or the turbine and compressor stages that are connected together by the interconnecting shaft 26 with the lowest rotational speed in the engine (i.e. not including the gearbox output shaft that drives the fan 23). In some literature, the "low pressure turbine" and "low pressure compressor" referred to herein may alternatively be known as the "intermediate pressure turbine" and "intermediate pressure compressor". Where such alternative nomenclature is used, the fan 23 may be referred to as a first, or lowest pressure, compression stage.

Figure 3:
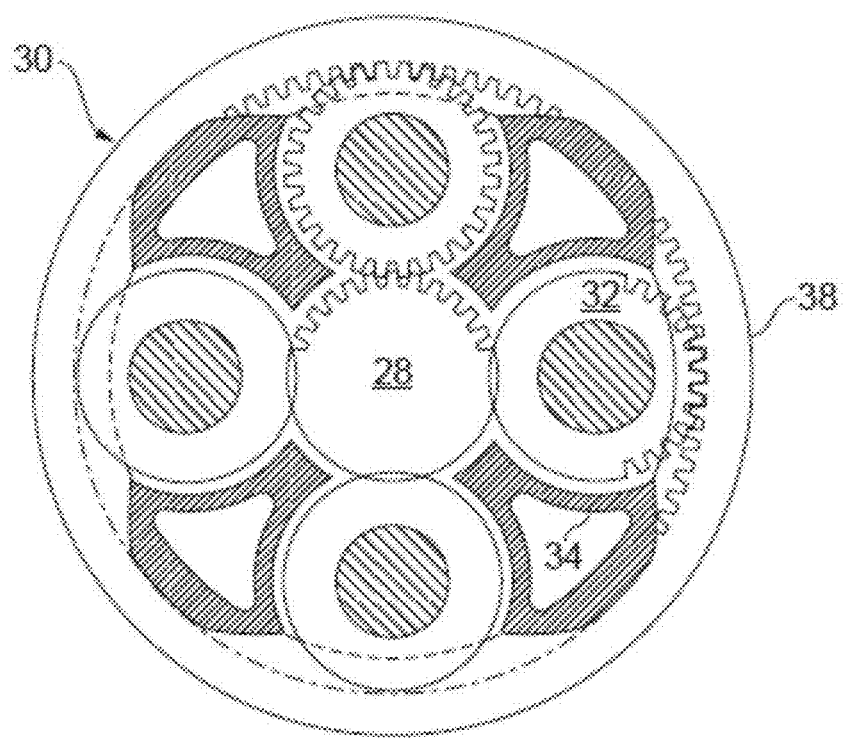
FIG. 3 is a partially cut-away view of a gearbox for a gas turbine engine.

The epicyclic gearbox 30 is shown by way of example in greater detail in FIG. 3. Each of the sun gear 28, planet gears 32 and ring gear 38 comprise teeth about their periphery to intermesh with the other gears. However, for clarity only exemplary portions of the teeth are illustrated in FIG. 3. There are four planet gears 32 illustrated, although it will be apparent to the skilled reader that more or fewer planet gears 32 may be provided within the scope of the claimed invention. Practical applications of a planetary epicyclic gearbox 30 generally comprise at least three planet gears 32.

The epicyclic gearbox 30 illustrated by way of example in FIGS. 2 and 3 is of the planetary type, in that the planet carrier 34 is coupled to an output shaft via linkages 36, with the ring gear 38 fixed. However, any other suitable type of epicyclic gearbox 30 may be used. By way of further example, the epicyclic gearbox 30 may be a star arrangement, in which the planet carrier 34 is held fixed, with the ring (or annulus) gear 38 allowed to rotate. In such an arrangement the fan 23 is driven by the ring gear 38. By way of further alternative example, the gearbox 30 may be a differential gearbox in which the ring gear 38 and the planet carrier 34 are both allowed to rotate.

It will be appreciated that the arrangement shown in FIGS. 2 and 3 is by way of example only, and various alternatives are within the scope of the present disclosure. Purely by way of example, any suitable arrangement may be used for locating the gearbox 30 in the engine 10 and/or for connecting the gearbox 30 to the engine 10. By way of further example, the connections (such as the linkages 36, 40 in the FIG. 2 example) between the gearbox 30 and other parts of the engine 10 (such as the input shaft 26, the output shaft and the fixed structure 24) may have any desired degree of stiffness or flexibility. By way of further example, any suitable arrangement of the bearings between rotating and stationary parts of the engine (for example between the input and output shafts from the gearbox and the fixed structures, such as the gearbox casing) may be used, and the disclosure is not limited to the exemplary arrangement of FIG. 2. For example, where the gearbox 30 has a star arrangement (described above), the skilled person would readily understand that the arrangement of output and support linkages and bearing locations would typically be different to that shown by way of example in FIG. 2.

Accordingly, the present disclosure extends to a gas turbine engine having any arrangement of gearbox styles (for example star or planetary), support structures, input and output shaft arrangement, and bearing locations.

Optionally, the gearbox may drive additional and/or alternative components (e.g. the intermediate pressure compressor and/or a booster compressor).

Other gas turbine engines to which the present disclosure may be applied may have alternative configurations. For example, such engines may have an alternative number of compressors and/or turbines and/or an alternative number of interconnecting shafts. By way of further example, the gas turbine engine shown in FIG. 1 has a split flow nozzle 18, 20 meaning that the flow through the bypass duct 22 has its own nozzle 18 that is separate to and radially outside the core exhaust nozzle 20. However, this is not limiting, and any aspect of the present disclosure may also apply to engines in which the flow through the bypass duct 22 and the flow through the core 11 are mixed, or combined, before (or upstream of) a single nozzle, which may be referred to as a mixed flow nozzle. One or both nozzles (whether mixed or split flow) may have a fixed or variable area. Whilst the described example relates to a turbofan engine, the disclosure may apply, for example, to any type of gas turbine engine, such as an open rotor (in which the fan stage is not surrounded by a nacelle) or turboprop engine, for example. In some arrangements, the gas turbine engine 10 may not comprise a gearbox 30.

The geometry of the gas turbine engine 10, and components thereof, is defined by a conventional axis system, comprising an axial direction (which is aligned with the rotational axis 9), a radial direction (in the bottom-to-top direction in FIG. 1), and a circumferential direction (perpendicular to the page in the FIG. 1 view). The axial, radial and circumferential directions are mutually perpendicular.

Figure 4:
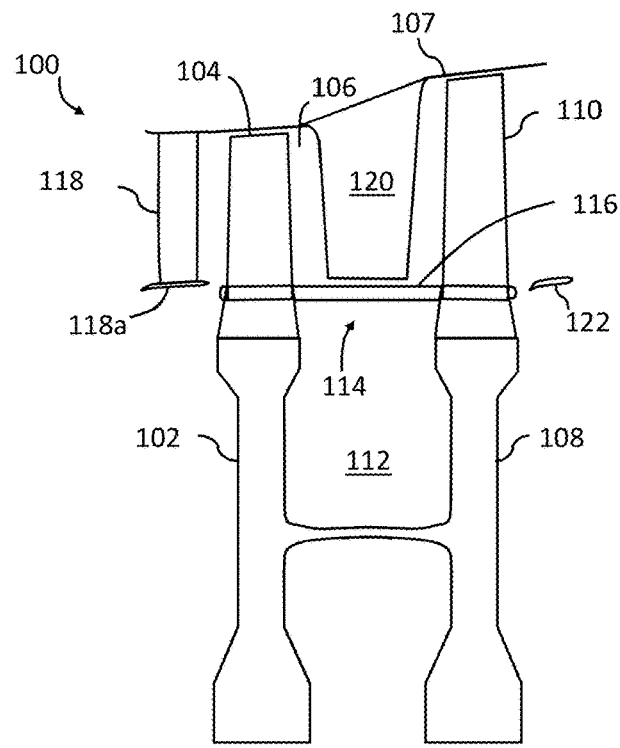
FIG. 4 is a schematic sectional view of a portion of a gas turbine engine according to one embodiment.

A portion of a turbine section of the gas turbine engine 10 is shown in FIG. 4. The turbine section illustrated may be part of the high pressure turbine 17 introduced above. The features described below may also apply equally to any other turbomachine. This may include the turbine or compressor stages of the gas turbine engine 10, including, for example, the low pressure turbine 19, the low pressure compressor 14 or the high pressure compressor 15 or any other compressors or turbines that may be present.

FIG. 4 illustrates a turbomachine 100 that comprises a first rotor disc 102 arranged to rotate about a fixed central axis (e.g. principle rotation axis 9). The turbomachine 100 further comprises a first plurality of rotor blades 104, one of which is shown in FIG. 4. The rotor blades 104 are connected to the rotor disc such that they extend through a gas flow path 106 through the turbomachine 100. The rotor blades are thus disposed within the gas flow path such that gas flowing through the turbomachine 100 is directed onto the rotor blades 104 in order to cause them to rotate. The rotor blades 104 are generally removably attached to an outer periphery of the rotor disc 102, with the gas flow path being formed by an annular duct surrounding the rotor disc 104. The periphery of the gas flow path 106 may be defined by an intercase structure 107 forming a housing of the turbomachine 100.

In the embodiment shown in FIG. 4, the turbomachine 100 further comprises a second rotor disc 108. The second rotor disc 108 is also arranged to rotate about the central axis along with the first rotor disc 102. They may, for example, be coupled by a drive shaft connected between them (not shown in the Figures). A second plurality of rotor blades 110 may be coupled to the second rotor disc 108 in a similar manner as the first plurality of blades 104 are attached to the first rotor disc 102. The space between the first rotor disc 102 and the second rotor disc 108 defines an interdisc cavity 112.

The turbomachine 100 further comprises a rotating annulus 114. The rotating annulus 114 is arranged to rotate in a fixed rotational alignment relative to the rotor disc 102 (and also the second rotor disc 106). The rotating annulus 114 therefore rotates around the central axis at the same rate as the rotor discs 102, 104 so that there is no relative rotational movement between them.

An outer surface 116 of the rotating annulus 114 is arranged to define part of the boundary of the gas flow path 106. The rotating annulus 114 therefore acts to contain gas flow within the gas flow path. The rotating annulus 114 may, for example, define a boundary between the gas flow path 106 and the interdisc cavity 112.

The use of the rotating annulus 114 to contain gas flow within the turbomachine 100 provides an efficient containment of gas within the gas flow path 106. The rotating annulus 114 may remove the need to provide a sealing structure coupled to a static guide vane disposed within the gas flow path 106. This may remove or reduce the load applied to the static guide vane, and provide a less complex geometry of the turbomachine 100. Furthermore, the use of the rotating annulus 114 removes the need for rim seals between the first plurality of rotor blades 104 or first rotor disc 102 and a relatively stationary structure forming a boundary of the gas flow path 106 (e.g. part of a static guide vane). The need for rim seals between such a stationary structure and the second plurality of rotor blades 110 or second rotor disc 108 is also removed. The reduction in air flow from the gas flow path may reduce the secondary airflow system consumption required to contain the gas flow, thus improving the efficiency of the gas turbine engine 10.

In the embodiment shown in FIG. 4, the turbomachine 100 further comprises a first stage static guide vane 118. The first stage static guide vane 118 is disposed within the gas flow path 106 and is arranged to direct airflow upstream of the first plurality of rotor blades 104. An end structure 118a of the first stage static guide vane 118 and the intercase structure 107 may form a nozzle through which airflow is directed to the first plurality of rotor blades 104. A sealing feature may be provided between the first plurality of rotor blades 104 and the first stage static guide vane 118 to contain airflow with the airflow path 106. The sealing feature may be a rim seal or any other suitable seal.

The turbomachine 100 may further comprise a second stage static guide vane 120 disposed within the gas flow path 106. The second stage static guide vane 120 extends radially from the intercase structure 107 towards the rotating annulus 114. A sealing feature may be provided between the second stage static guide vane 120 and the rotating annulus 114 as will be described later. The second stage static guide vane 120 is arranged to direct airflow at a position downstream of the first plurality of rotor blades 104. It may, for example, direct airflow onto the second plurality of rotor blades 110.

The turbomachine 100 may further comprise an output nozzle defined by a duct 122 and the intercase structure 107. A sealing feature (not shown in the figures) may be provided to seal between the duct 122 and the second rotor disc 108. The sealing feature may be a rim seal or any other suitable seal.

In the embodiment shown in FIG. 4, the turbomachine 100 is a two stage turbomachine i.e. it comprises a first and second plurality of rotor blades 104, 110. In other embodiments, any other suitable number of stages may be provided, each having a corresponding rotor disc and connected plurality of rotor blades. A rotating annulus may be provided between the rotor blades of each stage.

Figure 5:
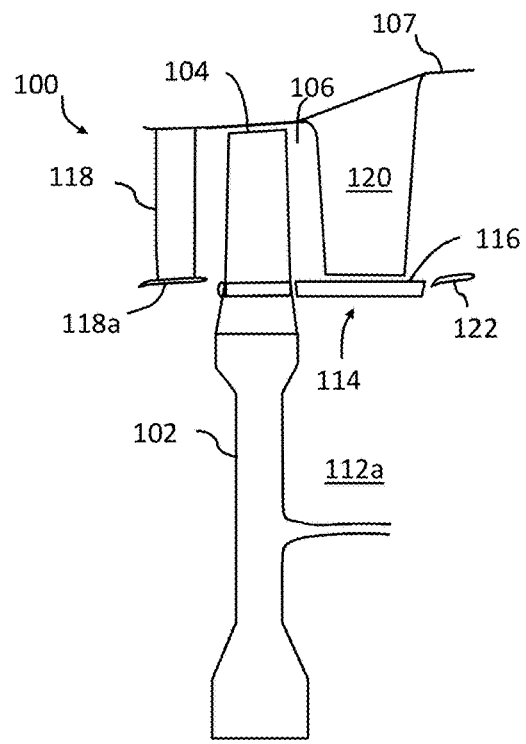
FIG. 5 is a schematic sectional view of a portion of a gas turbine engine according to another embodiment.

In another embodiment the turbomachine 100 may have only a single stage. An example of this is illustrated in FIG. 5. In this embodiment, the rotating annulus 114 is located between the first rotor disc 102 and the duct 122. The outer surface 116 of the rotating annulus therefore forms a boundary between the gas flow path 106 and the cavity 112a downstream of the first rotor disc 102. In the example shown in FIG. 5 the second rotor disc 108 and second plurality of rotor blades 110 are therefore absent.

The rotating annulus 114 of any embodiment described herein may be formed from a plurality of individual segments or may alternatively be formed from a continuous single annular piece. Suitable sealing features may be provided between segments. Some or all of the individual segments may be mounted in a fixed rotational orientation relative to the first rotor disc 102.

The rotating annulus 114 of any embodiment described herein may be formed from a high temperature capable material. The high temperature capable material may be ceramic matrix composite (CMC) material. In other embodiments, any other suitable high temperature capable material may be used, such as a high temperature capable metal or alloy e.g. a nickel alloy.

The second stage static guide vane 120 (or any other static guide vane to which a sealing engagement with the rotating annulus is formed) may also be formed from a ceramic matrix composite. The use of the rotating annulus 114 may allow a more simple structure to be used for the static guide vane 120 as it is no longer required to support a structure that forms the boundary of the gas flow path 106. This may be advantageous where the static guide vane 120 is made from CMC. A complex structure is more difficult to manufacture in CMC, and additional structural supporting elements may be required if it is to act to define the gas flow boundary or support a sealing feature to seal to the rotor discs or rotor blades. Such an additional supporting structure may add weight and require additional secondary air flow to provide cooling.

In order for the rotating annulus 114 to rotate in stationary alignment with the first and/or second rotor discs 102, 108 it may be mounted to any one or more of: i) either or both of the first and second rotor discs 102, 108; ii) a separate rotor disc, or iii) either or both of the first and second plurality of rotor blades 104, 110. Other mountings for the rotating annulus 114 may be possible.

Figure 6A:
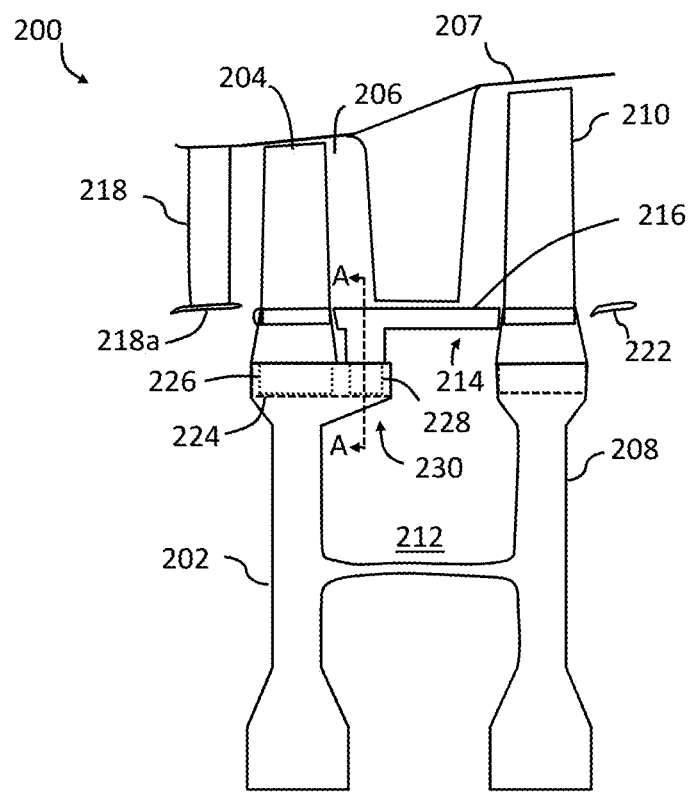
FIG. 6A is a schematic sectional view of a portion of a gas turbine engine according to another embodiment.
Figure 6B:
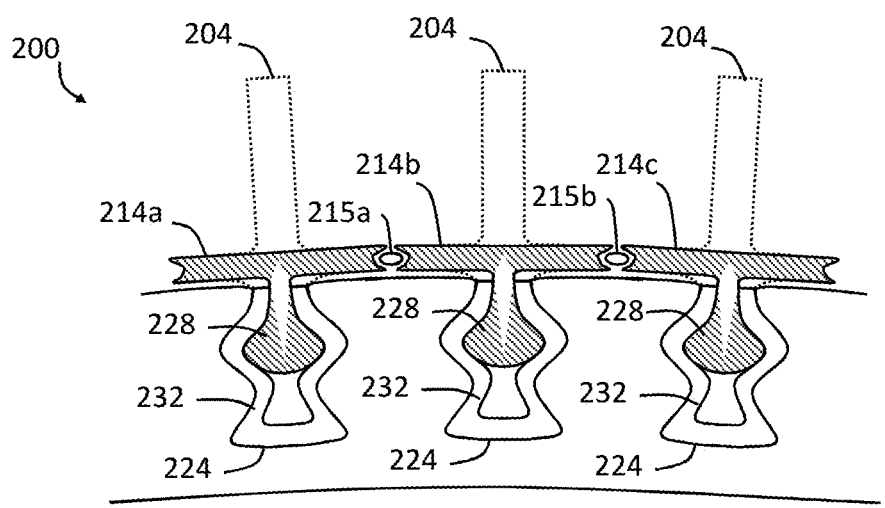
FIG. 6B is cross section view along section AA marked in FIG. 6A.

FIGS. 6A and 6B illustrate an embodiment of a turbomachine 200 comprising a rotating annulus 214. The turbomachine 200 shown in FIGS. 6A and 6B is similar to the turbomachine 100 shown in FIG. 4. Corresponding reference numerals have been used accordingly. Each of features 102 to 122 of turbomachine 100 correspond to the equivalent features 202 to 222 of turbomachine 200.

The rotating annulus 214 is mounted directly to the first rotor disc 202 of the turbomachine 200 to provide rotational alignment between them.

In the embodiment shown in FIGS. 6A and 6B each of the first plurality of rotor blades 204 are connected to the first rotor disc 202 by a respective interlocking connection. The interlocking connection is shown in more detail in the cross section AA shown in FIG. 6B. Each interlocking connection comprises an interlocking profile 224 on the first rotor disc 202 and a corresponding interlocking profile 226 on the respective rotor blade of the plurality of first rotor blades 204. Similar interlocking connections may be provided to connect the second plurality of rotor blades 210 to the second rotor disc 208, or any other sets of rotor blades and associated rotor discs provided.

The interlocking profiles 224 provided on the rotor disc 202, 208 may form a female part of the interlocking connection. The interlocking profiles may, for example, comprise a slot in the outer peripheral surface of the rotor disc 202, 208. The interlocking profile 226 on each rotor blade may form a corresponding male part of the interlocking connection, and may be removably received (e.g. by sliding in an axial direction) by the interlocking profile 224 of the rotor disc.

The interlocking profile 224 on the rotor disc 202, 208 may comprise three or more recesses, with the interlocking profile 226 of each blade comprising three or more corresponding lobes arranged to be received in the recesses. The interlocking connection may therefore be a fir tree connection. In other embodiments, any other suitable shape interlocking profiles may be provided. For example, the shape and number of lobes may be different (e.g. to form a dovetail connection), or other interlocking shape used. The interlocking profiles may, for example, have 1, 2, 3, 4, or 5, or more lobes and corresponding recesses. In yet other embodiments, the interlocking connection may be reversed such that the female part is provided on the rotor blades and the male part provided on the rotor disc.

The rotating annulus 214 may comprise one or more interlocking profiles 228 each adapted to form an interlocking connection with one or more of the interlocking profiles 224 on the rotor disc 102. In the embodiment shown in FIGS. 6A and 6B, the rotating annulus 214 is formed from a plurality of segments 214a, 214b, 214c, three of which are shown in FIG. 6B. Each of the segments 214a, 214b, 214c may be interconnected any suitable connection feature. In some embodiments, a sealing feature 215a, 215b may be provided between each segment 214a, 214b, 214c.

In the embodiment shown in FIG. 6B, each segment 214a, 214b, 214c may have an interlocking profile arranged to form an interlocking connection with a respective one of the interlocking profiles 224 on the rotor disc 202. A single interlocking profile on the rotor disc may therefore receive both a rotor blade and an interlocking profile on the rotating annulus. This may provide an efficient and space saving method of mounting the rotating annulus 214.

In other embodiments, an interlocking profile may be provided on only some of the segments. In yet other embodiments, the rotating annulus 214 may be formed from a single piece, with one or more interlocking profiles distributed around its circumference. The interlocking profiles 228 on the rotating annulus 214 are shown as male parts adapted to be received in the female part of the interlocking connection on the rotor disc 102. In other embodiments, the male and female parts may be reversed.

In order to accommodate both the interlocking profile 226 of one of the rotor blades and an interlocking profile on the rotating annulus 214 the first rotor disc 102 may comprise a peripheral cantilevered portion 230. This may extend axially from the body of the rotor disc 202. The portion of each interlocking profile 224 on the rotor disc 202 arranged to receive the interlocking profile of the rotating annulus may be formed in the cantilevered portion 230. The cantilevered portion 230 therefore acts to extend the length of the interlocking profile to receive both a rotor blade and the rotating annulus interlocking profiled. In other embodiments, any other suitable geometry may be provided to accommodate both interlocking profiles in the rotor disc.

The one or more interlocking profiles 228 provided on the rotating annulus 214 may have a different size and/or shape compared to the interlocking profiles provided on each of the rotor blades 106. The interlocking profile 226 provided on each rotor blade 106 may comprise at least three lobes or recesses (e.g. is a fir tree shape). The, or each, interlocking profile 228 formed on the rotating annulus 214 may comprise two lobes or recesses (e.g. is a dovetail shape). This may allow a more secure connection to be provided for the rotor blades 206, which experience a greater connection load compared to the rotating annulus 214.

In other embodiments, the interlocking profiles on the rotating annulus 214 and the rotor blades 204 may both have the same shape, but may be different sizes. They may, for example, both be fir tree or dovetail connections, but having different sized lobes and recesses. In yet other embodiments, the interlocking profiles on the rotating annulus 214 and the rotor blades 208 may be the same size and shape as each other.

The interlocking profiles on the rotating annulus 214 may similarly comprise three or more lobes or recesses to engage with corresponding lobes and recesses on the rotor disc 202, 208. In other embodiments, any other suitable shape interlocking profiles may be provided on the rotating annulus 214. For example, the shape and number of lobes or recesses may be different (e.g. to form a dovetail connection), or other interlocking shape used. The interlocking profiles on the rotating annulus 214 may, for example, have 1, 2, 3, 4, or 5, or more lobes or recesses. In yet other embodiments, the interlocking connection on the rotating annulus 214 may be reversed such that the female part is provided on the rotating annulus 214 and the male part provided on the rotor disc 202, 208.

Where the interlocking profiles on the rotor blades 208 and rotating annulus 214 are different from each other one or more adapter members 232 may be provided. The adapter members 232 may have a first interlocking profile shaped to interlock with the interlocking profile on the rotor disc 208 and a different second interlocking profile shaped to interlock with the interlocking profile on the rotating annulus 214. The adapter member(s) 232 may therefore act to modify the shape of the interlocking profile on the rotor disc 202 such that it may engage with the interlocking profile on the rotating annulus 214.

The adaptor members 232 may be formed from a sleeve arranged to be received in part of the, or each, interlocking profile 224 provided on the rotor disc 202. The portion of the interlocking profile having the sleeve may then receive the respective interlocking profile 228 on the rotating annulus 215. This may allow a continuously shaped uniform interlocking profile to be formed in the rotor disc 202 that can engage with different interlocking profiles on the rotor blades and the rotating annulus 214. This may allow the interlocking profile or profiles 224 on the rotor disc be easily manufactured, but allow different interlocking profiles tailored for the rotor blades 204 and rotating annulus 214 to be used.

A similar interlocking connection may be provided on the second rotor disc 208 in addition or as an alternative to that described on the first rotor disc 202.

Figure 7A:
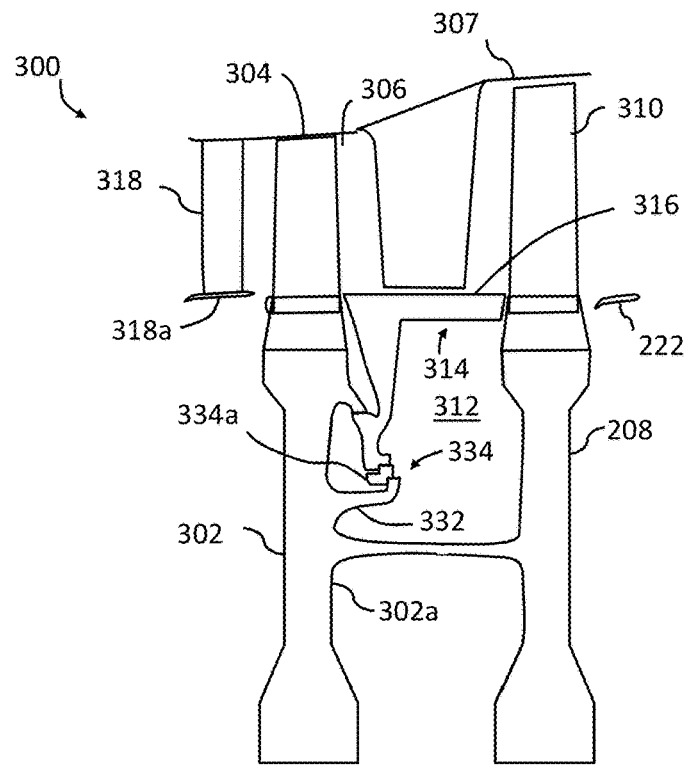
FIGS. 7A and 7B are schematic sectional views of a portion of a gas turbine engine according to other embodiments.
Figure 7B:
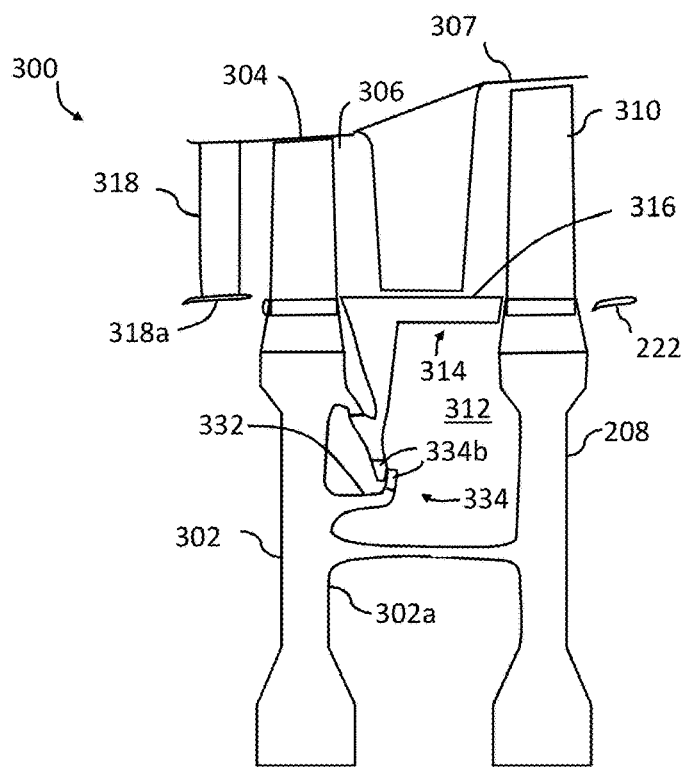

Another embodiment of a turbomachine 300 comprising a rotating annulus 314 is shown in FIG. 7A and 7B. The turbomachine 300 shown in FIGS. 7A and 7B is similar to the turbomachine 100 shown in FIG. 4. Corresponding reference numerals have been used accordingly. Each of features 102 to 122 of turbomachine 100 correspond to the equivalent features 302 to 322 of turbomachine 300.

In the embodiments shown in FIGS. 7A and 7B rotating annulus 314 is mounted directly to the first rotor disc 302. The first rotor disc 302 comprises a protrusion 332 extending axially from the face 302a of the first rotor disc 302. The rotating annulus 314 is mounted to the first rotor disc 304 via the protrusion 332 so that they are rotationally fixed relative to each other. The rotating annulus 314 and the rotor disc 304 may be coupled by a spigot connection.

A fastening mechanism 334 may be provided on the protrusion 332, the fastening mechanism 334 being configured to axially retain the rotating annulus 314 to the first rotor disc 302. In the embodiment illustrated in FIG. 7A, the fastening mechanism 334 comprises a locking ring or circlip 334a. In the embodiment illustrated in FIG. 7b, the fastening mechanism 334 comprises a locking bayonet. The locking bayonet may be formed by castellations 334b formed on the protrusion 332 and the rotating annulus 314. The fastening mechanism 334 may provide a secure coupling between the rotating annulus 314 and the first rotor disc 202 to resist relative axial movement between them. Other types of fastening mechanism may be used in other embodiments.

A second protrusion may additionally or alternatively be provided on the second rotor disc 208 to mount the rotating annulus 314. The protrusion on the second rotor disc 208 may be similar to that provided on the first rotor disc 302, and may similarly comprise a fastening mechanism as described above.

Figure 8:
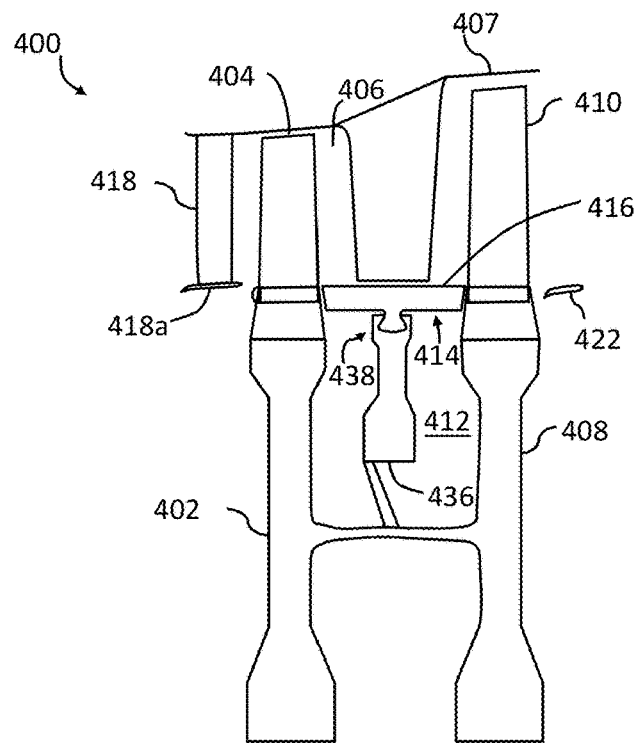
FIG. 8 is a schematic sectional view of a portion of a gas turbine engine according to another embodiment.

Another embodiment of a turbomachine 400 comprising a rotating annulus 414 is shown in FIG. 8. The turbomachine 400 shown in FIG. 8 is similar to the turbomachine 100 shown in FIG. 4. Corresponding reference numerals have been used accordingly. Each of features 102 to 122 of turbomachine 100 correspond to the equivalent features 402 to 422 of turbomachine 400.

The turbomachine 400 comprises an intermediate rotor disc 436 arranged to rotate around the central axis in a stationary alignment with the first rotor disc 402 (and hence also with the second rotor disc 408). The intermediate rotor disc 436 may be located within the interdisc cavity 412, or between the first rotor disc 402 and any other downstream structure in the case of a single stage turbomachine.

The rotating annulus 414 may be mounted to the intermediate rotor disc 436. The rotating annulus 414 may be mounted to the intermediate rotor disc 436 by an interlocking connection 438. The interlocking connection 438 may be partly formed by a circumferential recess formed in the peripheral outer surface of the intermediate rotor disc 436. The recess may be adapted to receive one or more protrusions formed on the rotating annulus 414. The interlocking connection 438 may be a dovetail connection as shown in FIG. 8; however other shaped interlocking profiles may be used (e.g. a fir tree connection). In embodiment shown in FIG. 8, the rotating annulus 414 may be formed from separate segments with some or each of them having an interlocking profile similar to the embodiment shown in FIG. 6B. In other embodiments, the rotating annulus 414 maybe formed from a single piece having one or more interlocking profiles distributed about its circumference.

Figure 9:
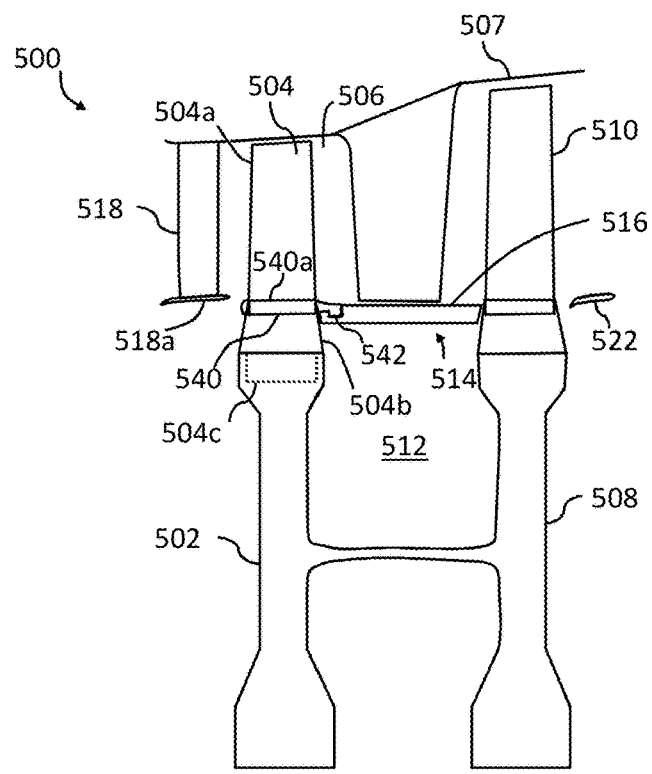
FIG. 9 is a schematic sectional view of a portion of a gas turbine engine according to another embodiment.

Another embodiment of a turbomachine 500 comprising a rotating annulus 514 is shown in FIG. 9. The turbomachine 500 shown in FIG. 9 is similar to the turbomachine 100 shown in FIG. 4. Corresponding reference numerals have been used accordingly. Each of features 102 to 122 of turbomachine 100 correspond to the equivalent features 502 to 522 of turbomachine 500.

The rotating annulus 514 is mounted to one or more of the first plurality of rotor blades 504 to provide rotational alignment between the first rotor disc 502 and the rotating annulus 514. Each of the first plurality of blades 504 may comprise an aerofoil 504a, a shank 504b and an interlocking profile 504c (or root) received in the first rotor disc 502 as described above. Each rotor blade 504 may further comprise a blade platform 540 between the aerofoil 504a and the shank 504b. An outer surface 540a of the blade platform 540 forms part of the boundary of the gas flow path 506.

In this embodiment, the rotating annulus 514 is mounted to the blade platform 540 of one or more of the first plurality of rotor blades 504. The blade platform 540 may comprise an axially extending hook member 542 adapted to provide a mounting for the rotating annulus 514, with a corresponding hook member or members provided on the rotating annulus 514 (e.g. on each of its segments or distributed around its circumference). In other embodiments, another suitable connection may be provided between blade platform 540 and the rotating annulus 514.

The hook member 542 may extend from a point at or near the outer surface 540a of the blade platform 540. This may allow the outer surface 540a of the blade platform and the outer surface 516 of the rotating annulus 514 to form a continuous boundary of the gas flow path 506.

Additionally or alternatively, a similar mounting of the rotating annulus 514 to a blade platform of one or more of the second plurality of rotor blades 510 may be provided.

Figure 10A:
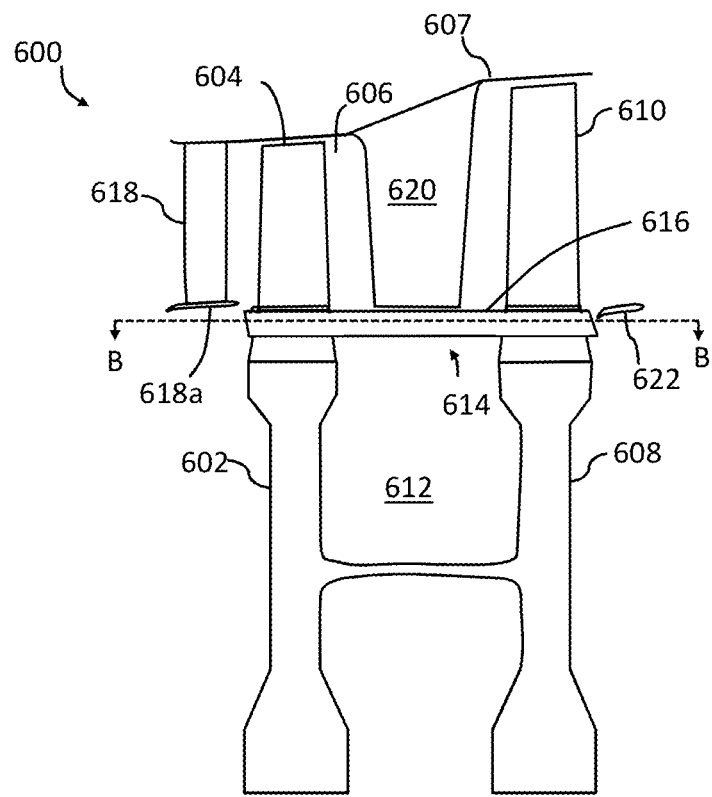
FIG. 10A is a schematic sectional view of a portion of a gas turbine engine according to another embodiment.
Figure 10B:
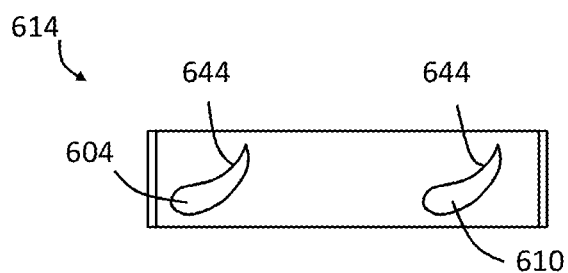
FIG. 10B is cross section view along section BB marked in FIG. 10A.

Another embodiment of a turbomachine 600 comprising a rotating annulus 614 is shown in FIGS. 10A and 10B. The turbomachine 600 shown in FIGS. 10A and 10B is similar to the turbomachine 100 shown in FIG. 4. Corresponding reference numerals have been used accordingly. Each of features 102 to 122 of turbomachine 100 correspond to the equivalent features 602 to 622 of turbomachine 600.

The rotating annulus 614 comprises a plurality of blade apertures 644, two of which are shown in FIG. 10B. The rotating annulus 614 is mounted to the first rotor disc 602 such that one or more of the first plurality of rotor blades 604 are received in a respective one of the plurality of blade apertures 644. One or more of the second plurality of rotor blades 610 may similarly be received in a respective one of the plurality of blade apertures 644. In other embodiments, only the first or the second plurality of rotor blades may be received in respective blade apertures so that the rotating annulus 614 is only coupled directly to the first or second plurality of rotor blades.

In the described embodiment, each segment of the rotating annulus 614 comprises two blade apertures 644, one of which is adapted to receive one of the first plurality of rotor blades 604, the other being adapted to receive one of the second plurality of rotor blades 610. This allows the distal ends of each segment of the rotating annulus 614 to be coupled to the first and second plurality of rotor blades 604, 610. In other embodiments, the blade apertures may be distributed around the circumference of a single piece rotating annulus 614, or additional apertures provided in each segment.

The rotor blades 604, 610 may extend through the body of the rotating annulus 614 to hold them securely in place. This may reduce the need to modify the rotor blades or provide a complex structure to rotationally couple the rotating annulus 614 to the rotor disc so that they rotate together. This may be advantageous where the rotor blades are made from CMC, which may be difficult to provide a suitable shape to provide an alternative mounting for the rotating annulus (e.g. by forming a hook structure on the blade platform).

Further blade apertures may be provided to couple to rotating annulus 614 to the plurality of rotor blades of any other rotor discs provided (e.g. a third, fourth etc. stage rotor disc).

In the embodiments described above the rotating annulus 114, 214, 314, 414, 514, 614 is mounted to the first rotor disc 104, 214, 304, 414, 504, 604 only. In other embodiments, the rotating annulus may additionally be mounted to the second rotor disc 108, 208, 308, 408, 508, 608 using similar mounting techniques. For example, the second rotor disc may be provided with the interlocking profile connection shown in FIGS. 6A and 6B, the protrusion 332 shown in FIGS. 7A and 7B, or the blade platform coupling shown in FIG. 9. In other embodiments, the rotating annulus may be coupled to only the second rotor disc.

An additional sealing feature may be provided to further contain gas in the gas flow path. Such a sealing feature may be provided where there is no direct coupling between the rotating annulus and the rotor disc or rotor blades. The sealing feature may be formed by a ring seal between the rotor disc and rotating annulus or secondary airflow sealing as required.

In yet other embodiments, the rotating annulus 114, 214, 314, 414, 514, 614 may be formed integrally with either or both of the first or second rotor discs. For example, the rotating annulus (or its segments) may be integrally formed with the blade platform rather than having a hook coupling between them as shown in FIG. 9.

The different embodiments of mounting the rotating annulus 114, 214, 314, 414, 514, 614 may not only be used separately as shown but may also be used combination. For example, the intermediate disc 436 may be used in combination with the rotor disc or rotor blade mounting shown in FIG. 6A, FIGS. 7A and 7B, FIG. 9 and FIG. 10. In other embodiments, different forms of rotor disc and rotor blade type mounting may be used. For example, the rotating annulus 114, 214, 314, 414, 514, 614 may be mounted to both the blade platform (as shown in FIG. 9) and the rotor disc body (as shown in FIGS. 7a and 7b). Both types of mounting may be provided to the same rotor disc, or one type of mounting to the first rotor disc and another type of mounting to the second rotor disc. Anything described in connection with one embodiment may be used in combination with the features of any other embodiment disclosed herein.

Figure 11:
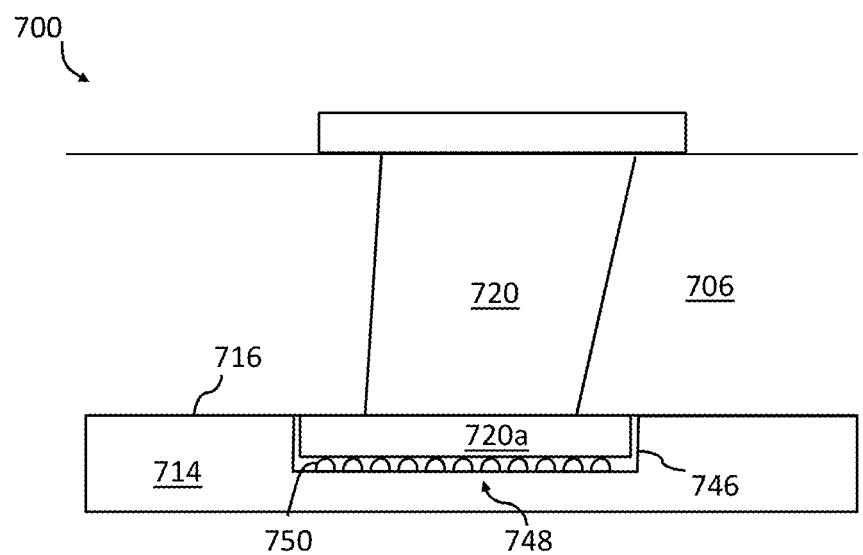
FIG. 11 is a schematic sectional view of a portion of a gas turbine engine according to another embodiment.

FIG. 11 shows a close up view of a turbomachine 700 comprising a rotating annulus 714, and a static guide vane 720 (e.g. the second stage static guide vane of previous embodiments) disposed within the gas flow path 706. The turbomachine 700 shown partly in FIG. 11 is similar to the turbomachine 100 shown in FIG. 4. Corresponding reference numerals have been used accordingly for features shown in FIG. 11.

The rotating annulus 714 comprises a sealing feature 748 adapted to seal to the static guide vane 720. The sealing feature 748 may comprise a trench region 746 formed in the outer surface 716 of the rotating annulus 714. The trench region 746 is arranged to receive a platform 720a of the static guide vane 720. This may move the interface between the rotating annulus 714 and platform 720a away from the outer surface 716 of the rotating annulus 714 forming the boundary of the gas flow path 706. This may help to improve sealing.

The sealing feature 748 may comprise one or more seal fins 750 (only one of which is labelled in FIG. 10) disposed on a surface of the trench region 746. The one or more seal fins 750 are adapted to form a seal between the rotating annulus 714 and the static guide vane 720.

In other embodiments, another suitable sealing feature may be provided between the static guide vane 720 and the rotating annulus 714. For example, a close fit between the static guide vane 720 and the rotating annulus 714 may be used, or the seal fins may be used without the trench region. In some embodiments, an abradable coating may be provided at the interface between the static guide vane 720 and the rotating annulus 714. Furthermore, the close fit may be provided by an active tip clearance control system.

Figure 12:
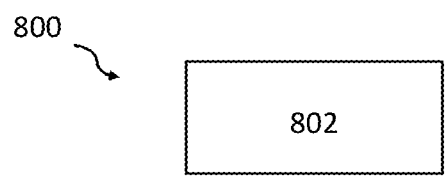
FIG. 12 illustrates a method according to an aspect of the disclosure.

FIG. 12 shows a method 800 of defining the boundary of a gas flow path within a turbomachine 100, 200, 300, 400, 500, 600, 700 of a gas turbine engine 10. The method 800 comprises mounting the rotating annulus 114, 214, 314, 414, 514, 614, 714 of any embodiment described herein such that it is arranged to rotate in a fixed alignment relative to a rotor disc of the turbomachine. The rotating annulus may be mounted according to any of the embodiments described above.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

We claim:

1. A turbomachine for a gas turbine engine, comprising:
a rotor disc arranged to rotate about a fixed central axis;
a plurality of rotor blades connected to the rotor disc, the rotor blades extending within a gas flow path; and
a rotating annulus arranged to rotate in a fixed rotational alignment relative to the rotor disc;
wherein an outer surface of the rotating annulus is arranged to define part of the boundary of the gas flow path, and
wherein the rotating annulus is mounted directly to the rotor disc to provide the rotational alignment between them.

2. The turbomachine according to claim 1, wherein each of the rotor blades is connected to the rotor disc by a respective interlocking connection, each interlocking connection comprising an interlocking profile on the rotor disc and a corresponding interlocking profile on the respective rotor blade, and wherein the rotating annulus comprises one or more interlocking profiles each adapted to form an interlocking connection with one or more of the interlocking profiles provided on the rotor disc.

3. The turbomachine according to claim 2, wherein the one or more interlocking profiles provided on the rotating annulus has a different size and/or shape compared to the interlocking profile provided on each of the rotor blades.

4. The turbomachine according to claim 2, wherein one or more of the interlocking connections further comprises an adapter member, the adapter member having a first interlocking profile shaped to interlock with the interlocking profile on the respective rotor disc and a different second interlocking profile shaped to interlock with the interlocking profile on the rotating annulus.

5. The turbomachine according to claim 3, wherein the interlocking profile provided on each rotor blade comprises at least three lobes or recesses and the, or each, interlocking profile formed on the rotating annulus comprises two lobes or recesses.

6. The turbomachine according to claim 2, wherein the rotor disc comprises a peripheral cantilevered portion extending axially from the body of the rotor disc, wherein each of the interlocking profiles adapted to form an interlocking connection with the rotating annulus is formed in the cantilevered portion.

7. The turbomachine according to claim 2, wherein the rotor disc comprises a protrusion extending axially from a face of the rotor disc, wherein the rotating annulus is mounted to the rotor disc via the protrusion, and optionally, wherein a fastening mechanism is provided to axially retain the rotating annulus to the rotor disc.

8. The turbomachine according to claim 1, wherein the rotating annulus is mounted to an intermediate rotor disc, wherein the intermediate rotor disc is arranged to rotate around the central axis in a stationary rotational alignment with the rotor disc.

9. The turbomachine according to claim 8, wherein the rotating annulus is mounted to the intermediate rotor disc by an interlocking connection, and optionally wherein the interlocking connection is a dovetail connection.

10. The turbomachine according to claim 1, wherein the rotating annulus is mounted to one or more of the plurality of rotor blades to provide rotational alignment between the rotor disc and the rotating annulus.

11. The turbomachine according to claim 10, wherein the rotating annulus is mounted to a blade platform of one or more of the plurality of rotor blades.

12. The turbomachine according to claim 11, wherein the blade platform further comprises an axially extending hook member, wherein the rotating annulus is mounted to the hook member, and optionally wherein:
an outer surface of each blade platform forms part of the boundary of the gas flow path, and wherein the hook member extends from a point at or near the outer surface of the blade platform.

13. The turbomachine according to claim 12, wherein the rotating annulus comprises a plurality of blade apertures, and wherein the rotating annulus is mounted to the rotor disc such that one or more of the plurality of rotor blades is received in a respective one of the plurality of blade apertures and such that each rotor blade extends through the body of the rotating annulus.

14. The turbomachine according to claim 1, wherein the rotating annulus is formed from a high temperature capable material, and optionally wherein the high temperature capable material is a ceramic matrix composite (CMC) material.

15. The turbomachine according to claim 1, wherein the rotating annulus comprises a sealing feature adapted to seal to a static guide vane disposed within the gas flow path, and optionally wherein:
the sealing feature comprises a trench region formed in the outer surface of the rotating annulus, the trench region arranged to receive a platform of the static guide vane, and further optionally wherein:
the sealing feature comprises one or more seal fins disposed on a surface of the trench region, and wherein the one or more seal fins are adapted to form a seal between the rotating annulus and the static guide vane.

16. The turbomachine according to claim 1, wherein the rotating annulus is formed from a plurality of segments, and optionally wherein each segment is individually mounted in a fixed rotational alignment with the rotor disc.

17. The turbomachine according to claim 1, wherein the rotor disc is a first rotor disc and the turbomachine further comprises a second rotor disc, the first and second rotor discs defining the interdisc cavity between them, and wherein the rotating annulus is arranged to define a boundary between the gas flow path and the interdisc cavity.

18. A gas turbine engine for an aircraft, the gas turbine engine comprising the turbomachine according to claim 1.

19. A method of defining the boundary of a gas flow path within a turbomachine, the method comprising:
mounting the rotating annulus defined in claim 1 such that the rotating annulus is arranged to rotate in a fixed alignment relative to a rotor disc of the turbomachine.

* * * * *